US011420581B2

(12) United States Patent
Ogiso

(10) Patent No.: US 11,420,581 B2
(45) Date of Patent: Aug. 23, 2022

(54) VEHICLE DEVICE OPERATION APPARATUS

(71) Applicant: AISIN CORPORATION, Aichi (JP)

(72) Inventor: Takashi Ogiso, Tajimi (JP)

(73) Assignee: AISIN CORPORATION, Kariya (JP)

(*) Notice: Subject to any disclaimer, the term of this patent is extended or adjusted under 35 U.S.C. 154(b) by 482 days.

(21) Appl. No.: 16/482,839

(22) PCT Filed: Sep. 6, 2017

(86) PCT No.: PCT/JP2017/032077
§ 371 (c)(1),
(2) Date: Aug. 1, 2019

(87) PCT Pub. No.: WO2018/142655
PCT Pub. Date: Aug. 9, 2019

(65) Prior Publication Data
US 2019/0359161 A1 Nov. 28, 2019

(30) Foreign Application Priority Data

Feb. 6, 2017 (JP) .............................. JP2017-019559

(51) Int. Cl.
B60R 21/207 (2006.01)
G10L 15/22 (2006.01)
(Continued)

(52) U.S. Cl.
CPC .............. *B60R 21/207* (2013.01); *B60N 2/90* (2018.02); *B60R 21/01* (2013.01); *G10L 15/22* (2013.01);
(Continued)

(58) Field of Classification Search
CPC ......... B60R 21/207; B60R 21/01; B60N 2/90; G10L 15/22; G10L 25/78; G10L 2015/223
See application file for complete search history.

(56) References Cited

U.S. PATENT DOCUMENTS

2005/0098417 A1 5/2005 Miyako et al.
2008/0042408 A1 2/2008 Breed et al.
(Continued)

FOREIGN PATENT DOCUMENTS

CN 104260647 A 1/2015
CN 105501121 A 4/2016
(Continued)

OTHER PUBLICATIONS

International Search Report dated Oct. 3, 2017 in PCT/JP2017/032077 filed Sep. 6, 2017.
(Continued)

Primary Examiner — Mathew Franklin Gordon
(74) Attorney, Agent, or Firm — Oblon, McClelland, Maier & Neustadt, L.L.P.

(57) ABSTRACT

This vehicle device operation apparatus is provided with: a deforming body which is configured so as to be attached to a vehicle seat and in which a fluid is sealed; and a control device. The control device is configured so as to detect the inner pressure of the deforming body, detect an adjusting operation which is an occupant's operation for adjusting the operated state of a vehicle device on the basis of a change in inner pressure of the deforming body caused by pressing of the deforming body through the body movement of an occupant seated on the seat, and execute adjustment control for adjusting the operated state of the vehicle device in response to the detection of the adjusting operation.

5 Claims, 5 Drawing Sheets

(51) Int. Cl.
*B60N 2/90* (2018.01)
*B60R 21/01* (2006.01)
*G10L 25/78* (2013.01)

(52) U.S. Cl.
CPC ........ *G10L 25/78* (2013.01); *G10L 2015/223* (2013.01)

(56) References Cited

U.S. PATENT DOCUMENTS

2010/0117414 A1   5/2010   Hwang et al.
2013/0112034 A1   5/2013   Sano

FOREIGN PATENT DOCUMENTS

| JP | 1-297332 A    | 11/1989 |
| JP | 2006-27394 A  | 2/2006  |
| JP | 2006-198071 A | 8/2006  |
| JP | 2010-115474 A | 5/2010  |
| JP | 2010-235021 A | 10/2010 |
| JP | 2013-97762 A  | 5/2013  |

OTHER PUBLICATIONS

Japanese Office Action dated Sep. 15, 2020 in Japanese Patent Application No. 2017-019559 (with unedited computer generated English Translation), 6 pages.
Chinese Office Action issued in Chinese Patent Application No. 201780085568 dated Apr. 6, 2022, (w/ partial English translation).

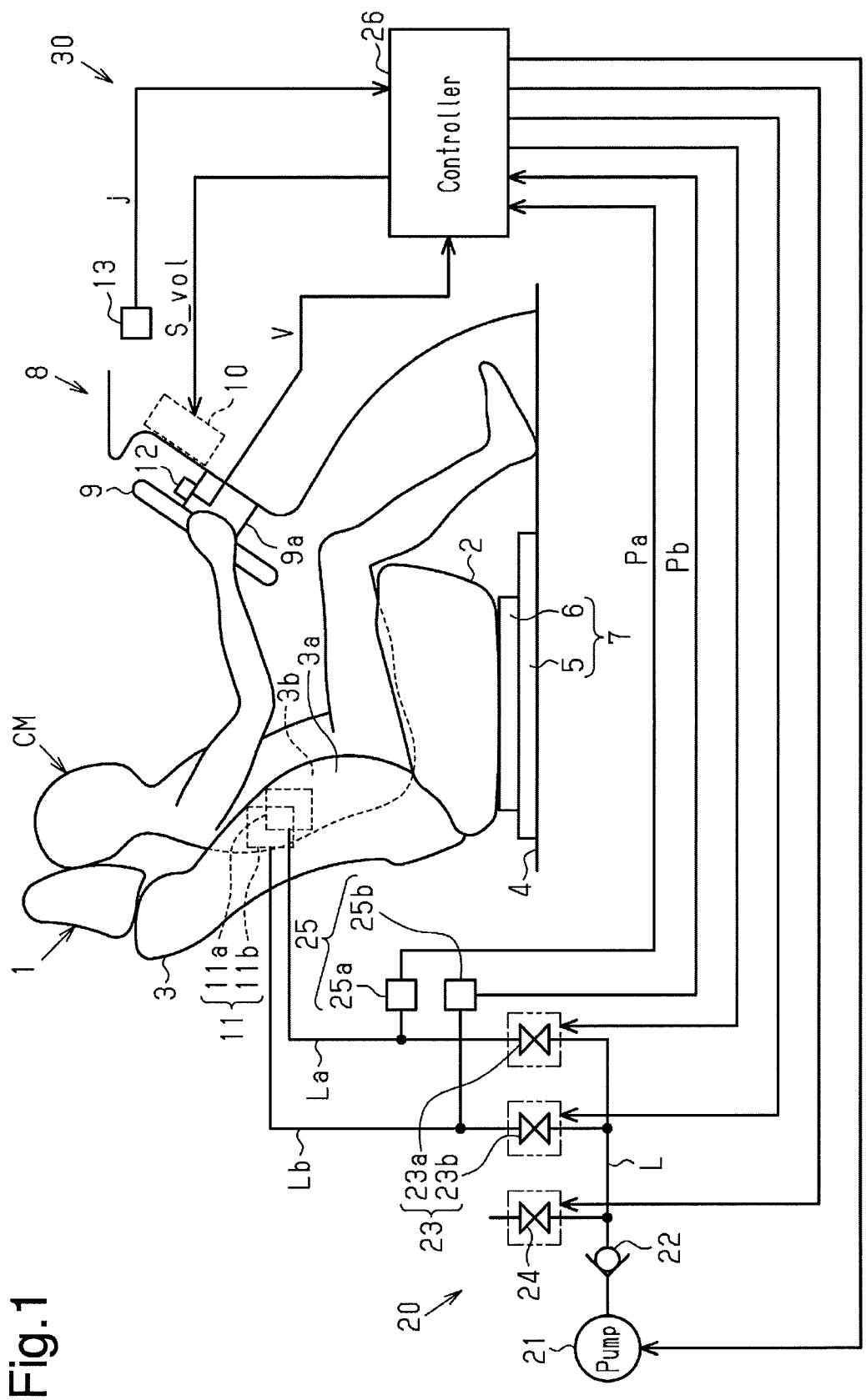

VEHICLE DEVICE OPERATION APPARATUS

TECHNICAL FIELD

The present invention relates to a vehicle device operation apparatus.

BACKGROUND ART

A vehicle device operation apparatus allows for operation of various types of vehicle devices, such as an audio device, while a vehicle occupant is driving a vehicle. One example of a vehicle device operation apparatus detects the voice of the vehicle occupant as an operation performed on a vehicle device or uses a switch, a sensor, or the like to detect the movement of the fingers of the vehicle occupant as an operation performed on the vehicle device.

Patent document 1 describes an example of a vehicle device operation apparatus that allows for operation of a vehicle device while a vehicle occupant is holding the steering wheel. The vehicle device operation apparatus includes an operation input unit configured by a sensor or the like to detect a pressing action that is a movement of the fingers of the vehicle occupant. The operation input unit is attached to a steering wheel or a steering column. The operation input unit includes an operation surface having a bulging shape so that the vehicle occupant can find the position that is to be pressed without looking at the position.

PRIOR ART LITERATURE

Patent Document

Patent Document 1: Japanese Laid-Open Patent Publication No. 2013-097762

SUMMARY OF THE INVENTION

Problem to be Solved by the Invention

With the vehicle device operation apparatus described in patent document 1, if the vehicle occupant cannot find the position that is to be pressed with his or her fingers or if the vehicle occupant erroneously presses a position that differs from the position that is to be pressed, the vehicle occupant will have to look at and check the position that is to be pressed or move his or her fingers to find the position that is to be pressed. This is not preferable from the viewpoint of convenience especially when the vehicle occupant is driving a moving vehicle. In particular, this shortcoming stands out when, for example, a number of operations are required and a certain amount of time is needed to complete an operation such as the adjustment of the volume of the audio device.

It is an objective of the present invention to provide a vehicle device operation apparatus that improves convenience when a vehicle occupant operates a vehicle device while driving a vehicle.

Means for Solving the Problem

A vehicle device operation apparatus that solves the above problem includes a deformable body, which is configured to be attached to a seat of a vehicle and filled with a fluid, and a controller. The controller is configured to detect an internal pressure of the deformable body. The controller is configured to detect an adjustment operation, which is an operation performed by a vehicle occupant to adjust an actuation state of a vehicle device, based on a change in the internal pressure of the deformable body that occurs when the vehicle occupant seated on the seat moves his or her body and presses the deformable body. Further, the controller is configured to execute adjustment control, which adjusts the actuation state of the vehicle device, upon detection of the adjustment operation.

BRIEF DESCRIPTION OF THE DRAWINGS

FIG. 1 is a schematic diagram showing a vehicle device operation apparatus.

EMBODIMENTS OF THE INVENTION

Figure 2A:
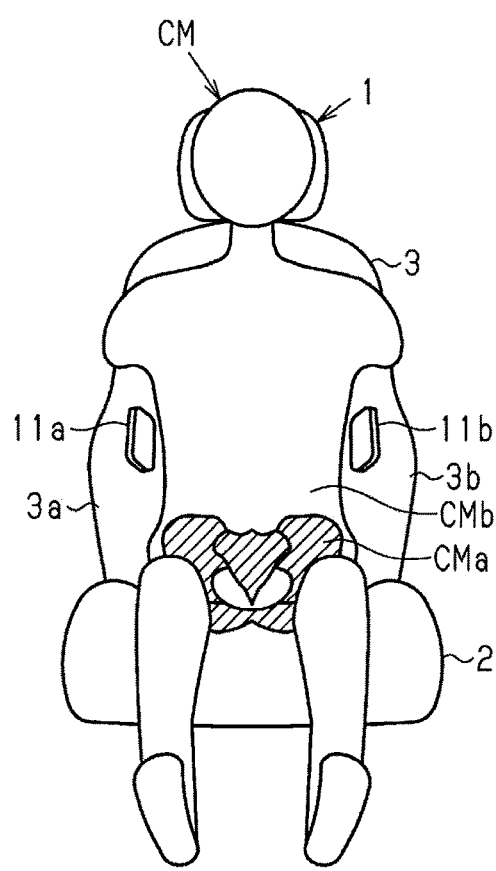
FIGS. 2A and 2B are schematic diagrams showing positions where airbags of the vehicle device operation apparatus of FIG. 1 are coupled in relation with a vehicle occupant.

One embodiment of a vehicle device operation apparatus will now be described. In the description hereafter, the front-rear direction of a vehicle will simply be referred to as "the front-rear direction," the widthwise direction of the vehicle will simply be referred to as "the widthwise direction," and the vertical direction of the vehicle will simply be referred to as "the vertical direction."

As shown in FIG. 1, a vehicle seat 1 of an automobile of the like includes a seat cushion 2 and a seatback 3 that can be tilted at the rear end of the seat cushion 2.

Left and right lower rails 5 extending in the front-rear direction are arranged on a floor 4 of the vehicle. Left and right upper rails 6 are respectively mounted on the two lower rails 5. The left and right upper rails 6 extend in the extension direction of the lower rails 5. Each upper rail 6 is configured to be relatively movable on the corresponding lower rail 5. The seat 1 is supported above a seat slide device 7 formed by the lower rails 5 and the upper rails 6.

An interior unit 8 extending in the vertical direction is arranged on the floor 4 in front of the seat 1. The interior unit 8 is provided with an instrument panel (not shown) including various instruments, a steering wheel 9 held by the vehicle occupant to steer the vehicle when driving the vehicle, and an audio device 10 that outputs music or the like in the passenger compartment.

More specifically, the seatback 3 of the seat 1 includes two widthwise side portions 3a and 3b, each bulging frontward. The two side portions 3a and 3b come into close contact with a vehicle occupant CM in the widthwise direction, that is, from the side, so that the vehicle occupant CM when seated on the seat 1 can be continuously held in a satisfactory seating position.

Airbags 11 (11a, 11b) that are charged with air are coupled to the inside of the seatback 3. In the present embodiment, there are two airbags 11. The airbags 11a and 11b are each inflated and deflated by increasing and decreasing the internal pressure through the supply and discharge of air. The airbags 11a and 11b are coupled to the two side portions 3a and 3b, respectively. In the present embodiment, each of the airbags 11a and 11b is an example of a deformable body.

As shown in FIG. 2A, which is a view of the seat 1 and the like of FIG. 1 taken from the front side (right side as viewed in FIG. 1), the right airbag 11a is coupled to the side portion 3a at the right side (left side as viewed in FIG. 2A) of the vehicle occupant CM. Further, the left airbag 11b is coupled to the side portion 3b at the left side (right side as viewed in FIG. 2A) of the vehicle occupant CM. The airbags 11a and 11b are arranged upward from the pelvis Cma (near anterior serratus muscles at chest sides) of the vehicle occupant CM, who is seated on the seat 1 in a neutral position posture in which the torso CMb (trunk) is located at the substantially central part of the seat 1 in the widthwise direction, in the two side portions 3a and 3b symmetrically at the left and right sides so as to sandwich the torso CMb of the vehicle occupant CM in the widthwise direction, that is, from the sides. The illustrated vehicle occupant CM is an average adult.

Figure 2B:
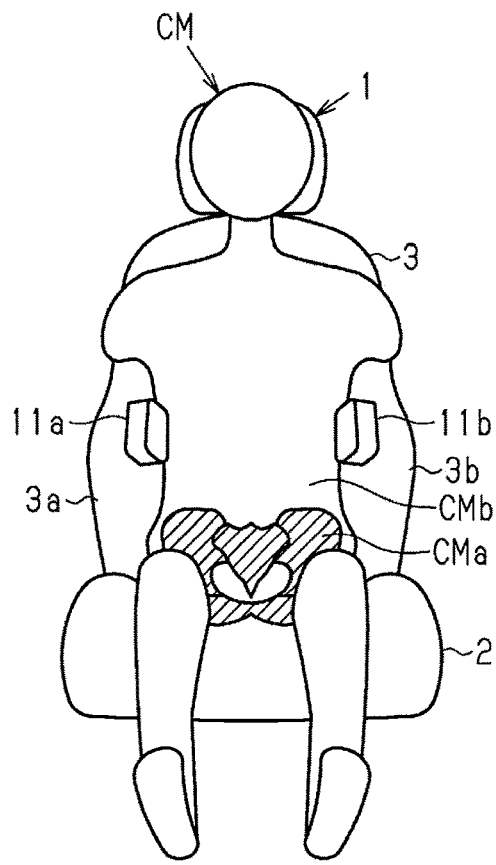

The airbags 11a and 11b are deflated in FIG. 2A, and the airbags 11a and 11b are inflated in FIG. 2B. The airbags 11a and 11b are actually arranged inside the side portions 3a and 3b. The airbags 11a and 11b are illustrated outside the side portions 3a and 3b to aid understanding of the deflated state and inflated state of the airbags 11a and 11b in FIGS. 2A and 2B. As shown in FIG. 2B, the inflated airbags 11a and 11b come into close contact through the two side portions 3a and 3b with the torso CMb of the vehicle occupant CM who is seated on the seat 1 in a neutral position posture. The vehicle occupant CM can tilt the torso CMb toward the left or right without greatly moving the torso CMb to press the airbags 11a and 11b respectively arranged in the two side portions 3a and 3b.

More specifically, the side portion 3a at the right side of the vehicle occupant CM is pressed by the torso CMb when the vehicle occupant CM tilts the torso CMb rightward. Thus, the body movement of the vehicle occupant CM presses the inflated right airbag 11a corresponding to the side portion 3a. Further, the side portion 3b at the left side of the vehicle occupant CM is pressed by the torso CMb when the vehicle occupant CM tilts the torso CMb leftward. Thus, the body movement of the vehicle occupant CM presses the inflated left airbag 11b corresponding to the side portion 3b.

In this manner, when the vehicle occupant CM moves his or her body and presses the inflated right airbag 11a, the internal pressure of the right airbag 11a is further increased and changed from the internal pressure of the inflated state while the internal pressure of the left airbag 11b is decreased and changed from the internal pressure of the inflated state. Further, when the vehicle occupant CM moves his or her body and presses the left airbag 11b, the internal pressure of the left airbag 11b is further increased and changed from the internal pressure of the inflated state while the internal pressure of the right airbag 11a is decreased and changed from the internal pressure of the inflated state. Thus, in the present embodiment, a quantitative relationship can be obtained between the body movement of the torso CMb of the vehicle occupant CM and changes in the internal pressure of each of the inflated airbags 11a and 11b. As a result, detection of a change in the internal pressure of each of the airbags 11a and 11b allows for detection of the body movement of the vehicle occupant, more specifically, whether the vehicle occupant CM has moved his or her body to press the airbags 11a and 11b and also which one of the airbags 11a and 11b the vehicle occupant CM is pressing by moving his or her body.

Returning to FIG. 1, an air supply-discharge device 20 is installed in the seat 1 to supply (charge) each of the airbags 11a and 11b with air and to discharge air from each of the airbags 11a and 11b. The air supply-discharge device 20 includes an air pump 21 that sends air to each of the airbags 11a and 11b. A flow passage L connecting the airbags 11a and 11b and the air pump 21 includes a check valve 22, supply valves 23 (23a and 23b), a discharge valve 24, and pressure sensors 25 (25a and 25b).

The flow passage L extends from the air pump 21 and is branched into a right branch line La that is connected to the right airbag 11a and a left branch line Lb that is connected to the left airbag 11b. The right supply valve 23a is arranged in the right branch line La. The left supply valve 23b is arranged in the left branch line Lb.

The right branch line La includes the right pressure sensor 25a between the right airbag 11a and the right supply valve 23a. The left branch line Lb includes the left pressure sensor 25b between the left airbag 11b and the left supply valve 23b. The right pressure sensor 25a detects the pressure at a location between the right airbag 11a and the right supply valve 23a in the right branch line La as the internal pressure of the right airbag 11a and outputs an output signal corresponding to the pressure. The left pressure sensor 25b detects the pressure at a location between the left airbag 11b and the left supply valve 23b in the left branch line Lb as the internal pressure of the left airbag 11b and outputs an output signal corresponding to the pressure. The output signals of the pressure sensors 25a and 25b are input to a controller 26 that is installed in the passenger compartment of the vehicle.

The controller 26 controls and actuates the air pump 21, the supply valves 23a and 23b, and the discharge valve 24 of the air supply-discharge device 20 based on the output signals of the pressure sensors 25a and 25b.

In this manner, a vehicle device operation apparatus 30 includes the airbags 11a and 11b, the air supply-discharge device 20, and the controller 26. The controller 26 detects body movement at the torso CMb of the vehicle occupant CM on the seat 1 from the detection results of the internal pressure values Pa and Pb respectively indicating the internal pressures of the airbags 11a and 11b.

Further, the controller 26 detects movement that presses each of the airbags 11a and 11b from the body movement of the vehicle occupant CM on the seat 1 as an adjustment operation performed by the vehicle occupant and outputs an instruction signal S_vol that adjusts the actuation state of an audio device 10. In this case, the instruction signal S_vol is a signal for adjusting the volume of the audio device 10. When the controller 26 detects movement that presses the right airbag 11a as an adjustment operation performed by the vehicle occupant, the controller 26 outputs an instruction signal S_vol that increases the volume by one step (vol: +(plus) 1). In contrast, when the controller 26 detects movement that presses the left airbag 11b as an adjustment operation performed by the vehicle occupant, the controller 26 outputs an instruction signal S_vol that decreases the volume by one step (vol: −(minus) 1). The instruction signal S_vol of the controller 26 is input to the audio device 10.

The vehicle device operation apparatus 30 includes a microphone 12 that detects the voice of the vehicle occupant CM. The microphone 12 is arranged in the vehicle compartment and arranged on a column 9a of the steering wheel 9 of the interior unit 8. The microphone 12 has directivity that allows for easy detection of the voice of the vehicle occupant CM who is driving the vehicle. The microphone 12 detects the voice of the vehicle occupant CM and outputs an output signal corresponding to the voice. The controller 26 detects an instruction given through the voice of the vehicle occupant CM from the output signal of the microphone 12. Instructions given through the voice of the vehicle occupant CM include, for example, an adjustment instruction for adjusting the volume of the audio device 10 such as "audio" and "volume adjustment" and an instruction that differs from an adjustment instruction, for example, an ending instruction that stops the volume adjustment of the audio device 10 such as "stop adjustment" or "end." The output signal of the microphone 12 is input to the controller 26 in the same manner as the output signals of the pressure sensors 25a and 25b. In the present embodiment, the microphone 12 is one example of a voice detector.

Further, the vehicle device operation apparatus 30 includes a vehicle state detection sensor 13 such as an acceleration sensor and a gyroscope that detects the travel state of the vehicle. The vehicle state detection sensor 13 is mounted on the vehicle at a predetermined position to detect, for example, a physical quantity j such as the lateral acceleration, roll angular velocity, and pitch angular velocity generated when the vehicle travels and output an output signal corresponding to the physical quantity j. The controller 26 detects the travel state of the vehicle from the output signal of the vehicle state detection sensor 13. The travel state of the vehicle includes, for example, turning and hard braking of the vehicle. The output signal of the vehicle state detection sensor 13 is input to the controller 26 in the same manner as the output signal of the pressure sensors 25a and 25b.

The controller 26 initiates volume adjustment of the audio device 10 when detecting the voice of the vehicle occupant CM and, based on the detection result, starts executing a process for detecting body movement of the vehicle occupant CM on the seat 1, that is, a process for detecting an adjustment operation performed by the vehicle occupant. Further, while detecting an adjustment operation performed by the vehicle occupant, the controller 26 detects the physical quantity j and determines from the detection result whether to validate or invalidate the detection of the adjustment operation performed by the vehicle occupant.

The controller 26 includes a central processing unit (CPU) and a memory, which are not shown in the drawings. The CPU executes programs stored in the memory to detect an adjustment operation performed by the vehicle occupant and output an instruction signal for adjusting the volume of the audio device 10. The controller 26 may include hardware (application-specific integrated circuit: ASIC) dedicated for the execution of at least some of various processes. More specifically, the controller 26 may be circuitry including 1) one or more dedicated hardware circuits such as ASICs, 2) one or more processors (microcomputers) that run on a computer program (software), or 3) a combination of the above. The controller 26 executes the process described below to adjust the volume of the audio device 10 as a process implemented when the CPU repetitively executes the programs stored in the memory in predetermined cycles.

Figure 3:
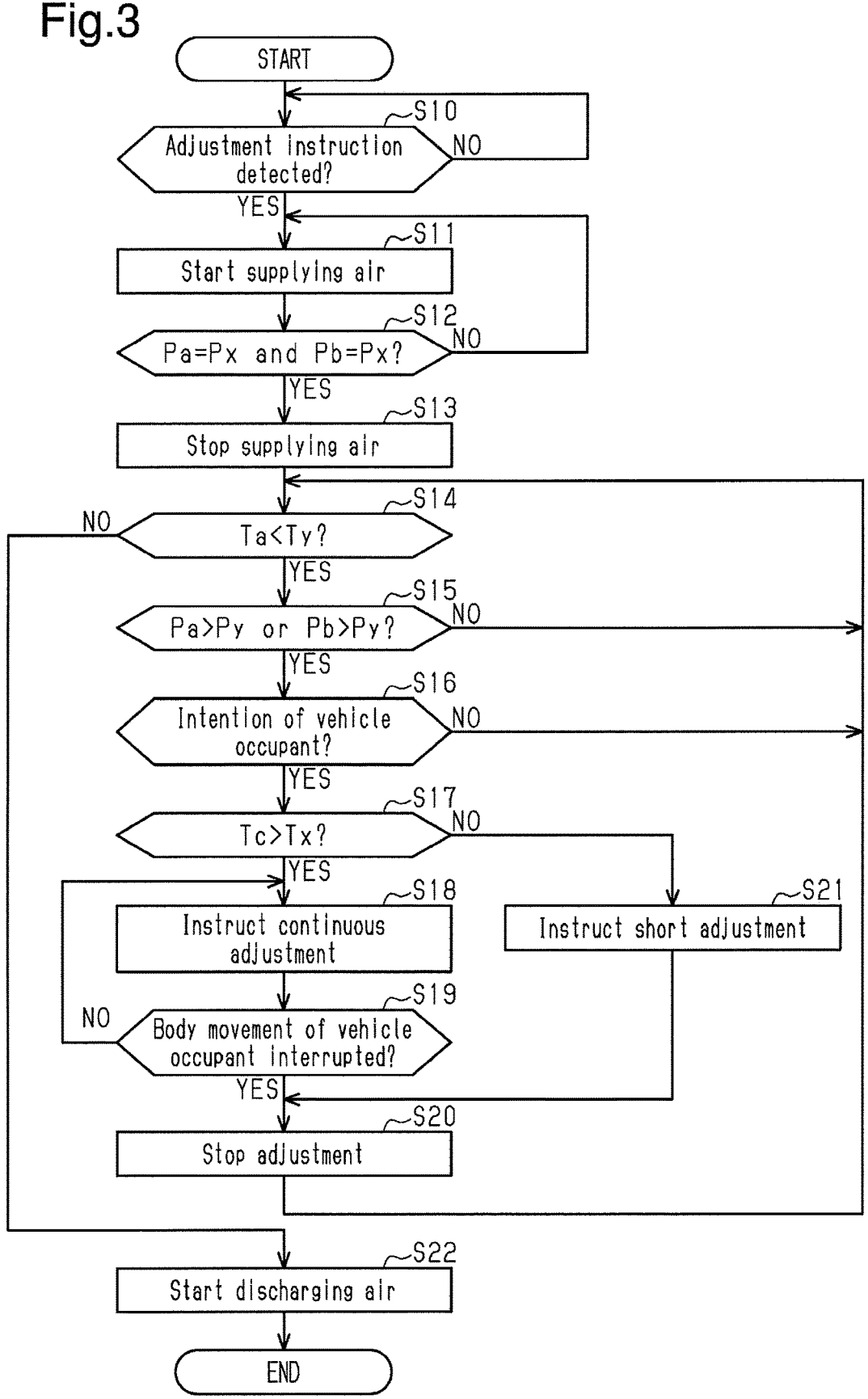
FIG. 3 is a flowchart of a process related to adjustment control executed by a controller of the vehicle device operation apparatus shown in FIG. 1.

FIG. 3 shows the processing procedure of the controller 26. The process illustrated in FIG. 3 is executed when the voice V is detectable through the microphone 12 after an ignition-on signal is input and the vehicle is activated.

The controller 26 detects the voice V from the output signal of the microphone 12 and determines whether an adjustment instruction has been detected from the voice V (step S10). When determining that an adjustment instruction from the vehicle occupant has not been detected (step S10: NO), the controller 26 returns to step S10 and repeats the process of step S10 until determining that an adjustment instruction from the vehicle occupant has been detected.

When determining that an adjustment instruction from the vehicle occupant has been detected (step S10: YES), the controller 26 starts supplying air to each of the airbags 11a and 11b to set or activate a mode for executing volume adjustment control on the audio device 10 (processes of step S14 to S20, which will be described later), that is, to set a state allowing for detection of an adjustment operation performed by the vehicle occupant (step S11).

In step S11, the controller 26 starts actuating the air pump 21, the supply valves 23a and 23b, and the discharge valve 24. That is, the controller 26 starts actuating the air supply-discharge device 20. In this case, the controller 26 obtains the internal pressure values Pa and Pb detected as the output signals of the pressure sensor 25a and 25b and controls the air pump 21, the supply valves 23a and 23b, and the discharge valve 24 so that the internal pressure values Pa and Pb become equal to a threshold value Px that is set as a predetermined target value. The threshold value Px is set as a value in a range obtained through experiments in which the airbags 11a and 11b come into close contact with the vehicle occupant through the two side portions 3a and 3b. In the present embodiment, close contact of the airbags 11a and 11b with the vehicle occupant through the two side portions 3a and 3b refers to a state in which the vehicle occupant is pressed from beside by a certain amount of force.

When charging the right airbag 11a with air, the controller 26 actuates the air pump 21 while opening the right supply valve 23a and closing the discharge valve 24. At the same time, the controller 26 detects the internal pressure value Pa of the right airbag 11a. When charging the left airbag 11b with air, the controller 26 actuates the air pump 21 while opening the left supply valve 23b and closing the discharge valve 24. At the same time, the controller 26 detects the internal pressure value Pb of the left airbag 11b. When discharging air from each of the airbags 11a and 11b, the controller 26 opens each of the supply valves 23a and 23b and the discharge valve 24.

After starting actuation of the air supply-discharge device 20, the controller 26 determines whether the internal pressure values Pa and Pb are both equal to the threshold value Px (Pa=Px and Pb=Px) (step S12). This process is performed to determine from each of the internal pressure values Pa and Pb whether the charging of each of the airbags 11a and 11b with air has been completed. When the internal pressure values Pa and Pb are both not equal to the threshold value Px (step S12: NO), the controller 26 determines that the charging of each of the airbags 11a and 11b with air has not been completed and returns to the process of step S11 to repeat the processes of steps S11 and S12 until determining that the charging of each of the airbags 11a and 11b with air has been completed.

When the internal pressure values Pa and Pb are both equal to the threshold value Px (step S12: YES), the controller 26 determines that the charging of each of the airbags 11a and 11b with air has been completed. That is, the controller 26 determines that a mode for executing volume adjustment control on the audio device 10 (state allowing for detection of adjustment operation performed by vehicle occupant) has been set and stops supplying air to each of the airbags 11a and 11b (step S13).

In step S13, the controller 26 controls the air supply-discharge device 20 to stop actuating the air pump 21 with each of the supply valves 23a and 23b and the discharge valve 24 in a closed state. In this case, the controller 26 generates a notification by intermittently lighting a display panel (not shown) of the audio device 10 or the like to indicate that the charging of each of the airbags 11a and 11b with air has been completed. In the present embodiment, the controller 26 may output sound or voice from a device such as a speaker to notify the vehicle occupant CM that the charging of each of the airbags 11a and 11b with air has been completed.

Then, the controller 26 determines whether an acceptance time Ta has not exceeded a threshold time Ty, which is a predetermined time (Ta<Ty) (step S14). The acceptance time Ta is the time elapsed from when the process of step S13 is completed. More specifically, in step S14, the controller 26 measures the acceptance time Ta from when the process of step S13 is completed in predetermined cycles.

When the controller 26 determines that the acceptance time Ta has exceeded the threshold time Ty (step S14: NO), the controller 26 starts discharging air from each of the airbags 11a and 11b to stop or end the mode for executing volume adjustment control on the audio device 10 (step S22) and then temporarily ends the series of processes illustrated in FIG. 3. Then, the controller 26 shifts to a state repetitively executing the process of step S10 until determining that an adjustment instruction from the vehicle occupant has been detected.

When the controller 26 determines that the acceptance time Ta has not exceeded the threshold time Ty (step S14: YES), the controller 26 determines whether the internal pressure value Pa or the internal pressure value Pb exceeds a threshold value Py (Pa>Py or Pb>Py) (step S15). This process is performed to detect whether the internal pressure values Pa and Pb of the airbags 11a and 11b has increased and changed from the threshold value Px, which is the internal pressure in the inflated state, that is, to detect whether a body movement of the vehicle occupant has occurred.

In step S15, when the internal pressure value Pa exceeds the threshold value Py, the controller 26 detects movement pressing the right airbag 11a as an adjustment operation performed by the vehicle occupant. When the internal pressure value Pb exceeds the threshold value Py, the controller 26 detects movement pressing the left airbag 11b as an adjustment operation performed by the vehicle occupant. The threshold value Py is set as a value in a range obtained through experiments in which a body movement of the vehicle occupant presses each of the airbags 11a and 11b.

When the controller 26 determines that the internal pressure value Pa and the internal pressure value Pb both do not exceed the threshold value Py (step S15: NO), the controller 26 determines that an adjustment operation performed by the vehicle occupant has not been detected and returns to the process of step S14. The controller 26 repetitively executes the processes of steps S14 and S15 until determining that the acceptance time Ta has exceeded the threshold time Ty or until determining that an adjustment operation performed by the vehicle occupant has been detected.

When the controller 26 determines that the internal pressure value Pa or the internal pressure value Pb has exceeded the threshold value Py (step S15: YES), the controller 26 determines that an adjustment operation performed by the vehicle occupant has been detected and then determines whether the adjustment operation performed by the vehicle occupant was intentional (step S16). This process is performed to determine whether the adjustment operation detected in step S15 is a result of the vehicle occupant CM intentionally moving his or her body or a result of the vehicle occupant CM unintentionally moving his or her body because of the traveling state such as turning or hard braking of the vehicle.

In step S16, the controller 26 detects the travel state of the vehicle from an output signal of the vehicle state detection sensor 13 that is in correspondence with the physical quantity j. More specifically, the controller 26 detects the travel state of the vehicle based on the physical quantity j. In this case, when turning or hard braking of the vehicle is not detected as the travel state of the vehicle, the controller 26 determines that the adjustment operation detected in step S15 is a result of the vehicle occupant intentionally moving his or her body. When turning or hard braking of the vehicle is detected as the travel state of the vehicle, the controller 26 determines that the adjustment operation detected in step S15 is a result of the vehicle occupant unintentionally moving his or her body.

When the controller 26 detects turning or hard braking of the vehicle and determines the adjustment operation performed by the vehicle occupant was unintentional (step S16: NO), the controller 26 does not reflect the adjustment operation in subsequent processes (i.e. adjustment control) and invalidates the adjustment operation. Then, the controller 26 returns to the process of step S14 and repetitively executes the processes of steps S14 and S15 until the acceptance time Ta exceeds the threshold time Ty or an adjustment operation performed by the vehicle occupant is detected.

When the controller 26 does not detect turning or hard braking of the vehicle and determines that the adjustment operation performed by the vehicle occupant was intentional (step S16: YES), the controller 26 reflects the adjustment operation in subsequent processes (i.e. adjustment control) and validates the adjustment operation. Then, the controller 26 determines whether a duration time Tc of the adjustment operation performed by the vehicle occupant has become longer than a threshold time Tx, which is a predetermined time (Tc>Tx) (step S17). This process is performed to determine whether a state in which the internal pressure value, which was determined as changing and increasing in step S15, exceeds the threshold value Py has become longer than the threshold time Tx to determine whether the adjustment operation performed by the vehicle occupant is an uninterrupted and continuous operation.

More specifically, in step S17, the controller 26 measures the duration time Tc from when determining in step S16 that the vehicle occupant intentionally performed the adjustment operation in predetermined cycles. Further, in step S17, the controller 26 determines whether the duration time Tc has become longer than the threshold time Tx as long as the internal pressure value, which was determined as changing and increasing in step S15, continues to exceed the threshold value Py.

Then, when the controller 26 determines that the duration time Tc has become longer than the threshold time Tx (step S17:YES), the controller 26 determines that the adjustment operation performed by the vehicle occupant is a continuous operation and outputs an instruction signal S_vol corresponding to the continuous operation (step S18). More specifically, the controller 26 outputs the instruction signal S_vol to continuously adjust the volume of the audio device 10 in an uninterrupted manner (step S18).

In step S18, when detecting movement pressing the right airbag 11a as an adjustment operation of the vehicle occupant, the controller 26 outputs the instruction signal S_vol to increase the volume in steps. When detecting movement pressing the left airbag 11b as an adjustment operation of the vehicle occupant, the controller 26 outputs the instruction signal S_vol to decrease the volume in steps.

Then, the controller 26 determines whether the continuous operation determined in step S18 has been interrupted (step S19). In step S19, the controller 26 determines whether the internal pressure value, which was determined as changing and increasing in step S15, has decreased to less than or equal to the threshold value Py.

When the internal pressure value, which was determined as changing and increasing in step S15, is still greater than the threshold value Py, the controller 26 determines that the continuous operation has not been interrupted (step S19: NO) and returns to the process of step S18. The controller 26 repetitively executes the processes of steps S18 and S19 until determining that the continuous operation has been interrupted. In this manner, when the continuous operation is not interrupted, the controller 26 repetitively executes the processes of steps S18 and S19 to successively instruct volume adjustment that continuously increases volume in steps or continuously decreases the volume in steps.

When the internal pressure value, which was determined as changing and increasing in step S15, decreases to less than or equal to the threshold value Py, the controller 26 determines that the continuous operation has been interrupted (step S19: YES) and stops outputting the instruction signal S_vol to stop adjustment of the volume of the audio device 10 (step S20). Then, the controller 26 returns to the process of step S14 and repetitively executes the processes of steps S14 and S15 until the acceptance time Ta exceeds the threshold time Ty or until an adjustment operation performed by the vehicle occupant is detected.

When the controller 26 determines that the duration time Tc is not as long as the threshold time Tx (step S17: NO), the controller 26 determines that the adjustment operation performed by the vehicle occupant is a short operation and not a continuous operation. Thus, the controller 26 outputs the instruction signal S_vol to perform a short adjustment of the volume of the audio device 10 (step S21). In step S21, the controller 26 outputs an instruction signal S_vol in the same manner as step S18. In this case, the controller 26 performs a short output of the instruction signal S_vol and then stops the output to stop adjusting the volume of the audio device 10 (step S20). Then, the controller 26 returns to the process of step S14 and repetitively executes the processes of steps S14 and S15 until the acceptance time Ta exceeds the threshold time Ty or an adjustment operation performed by the vehicle occupant is detected. In this manner, when the adjustment operation performed by the vehicle occupant is a short operation, the controller 26 instructs a short adjustment to increase the volume by one step or decrease the volume by one step through the process of step S21. When the short operation of the adjustment operation is performed a number of times by the vehicle occupant, the controller 26 repeats the process of step S21 to increase or decrease the volume one step at a time.

During the series of processes illustrated in FIG. 3, when the controller 26 detects an ending instruction from the voice V, the controller 26 starts discharging air from each of the airbags 11a and 11b to end the mode for executing the volume adjustment control on the audio device 10 based on the process of step S22 regardless of the process that is being executed.

The operation and advantages of the present embodiment will now be described.

(1) In the present embodiment, the airbags 11a and 11b are attached to the seat 1. This allows the vehicle occupant to easily recognize where each of the airbags 11a and 11b is located while seated on the seat 1 without the need to look at the airbags 11a and 11b. Thus, to adjust the volume of the audio device 10 in steps, the vehicle occupant only needs to move his or her body while seated on the seat 1 to press each of the airbags 11a and 11b attached to the seat 1 and change the internal pressure.

Figure 4:
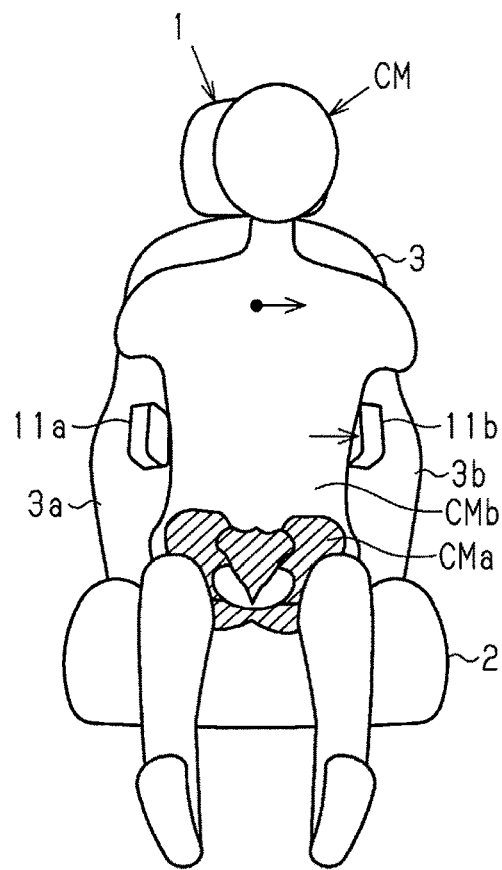
FIG. 4 is a schematic view illustrating body movement of the vehicle occupant when performing an adjustment operation.

For example, as shown in FIG. 4, in a state in which the charging of each of the airbags 11a and 11b has been completed, when the torso CMb of the vehicle occupant CM is tilted leftward (rightward as viewed in FIG. 4), the torso CMb presses the inflated left airbag 11b. In this case, the right airbag 11a is separated from the torso CMb of the vehicle occupant CM and slightly expanded from the inflated state.

Figure 5:
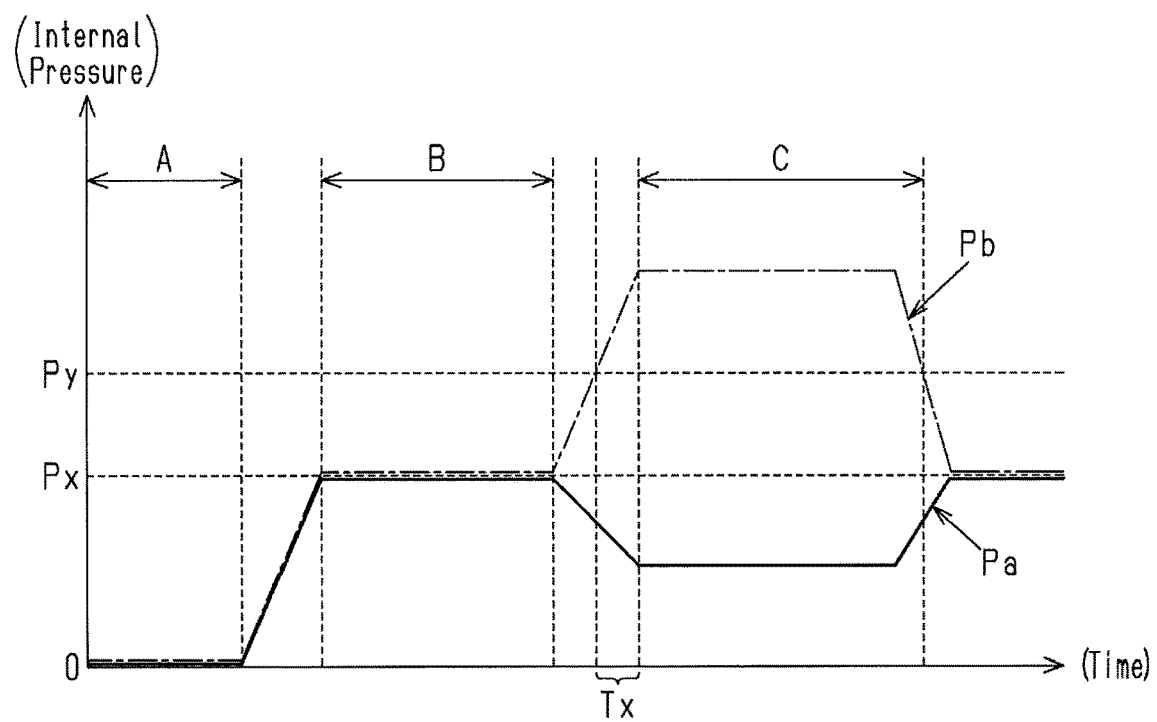
FIG. 5 is a graph schematically illustrating changes in the internal pressure of an airbag resulting from an adjustment operation performed by the vehicle occupant.

As shown by the single-dashed line in FIG. 5, during period A, the left airbag 11b is not charged with air, and the internal pressure value Pb of the left airbag 11b is maintained at a value that is substantially zero. Then, after the charging of the left airbag 11b with air is completed, during period B, the internal pressure value Pb of the left airbag 11b is maintained at the threshold value Px. When the inflated left airbag 11b is pressed, the internal pressure value Pb of the left airbag 11b changes and increases thereby exceeding the threshold value Py. In this case, as shown by the solid line in FIG. 5, during period A, the right airbag 11a is not charged with air, and the internal pressure value Pa of the right airbag 11a is maintained at a value that is substantially zero. Then, after the charging of the right airbag 11a with air is completed, during period B, the internal pressure value Pa of the right airbag 11a is maintained at the threshold value Px. When the inflated right airbag 11a is slightly expanded, the internal pressure value Pa of the right airbag 11a changes and decreases to less than the threshold value Px.

When the internal pressure value Pb changes and increases thereby exceeding the threshold value Py, this is detected as an adjustment operation performed by the vehicle occupant by the controller 26 in the process of step S15. When the adjustment operation performed by the vehicle occupant is valid, the controller 26 determines whether the adjustment operation is a continuous operation or a short operation and then controls adjustment of the volume state of the audio device 10 in the process of step S18 or step S21.

More specifically, as shown by the single-dashed line in FIG. 5, after the internal pressure value Pb of the left airbag 11b changes and increases thereby exceeding the threshold value Py, when the state in which the internal pressure value Pb exceeds the threshold value Py becomes longer than the threshold time Tx, it is determined that the adjustment operation of the vehicle occupant is a continuous operation. Thus, the volume is continuously decreased in steps until the continuous operation is interrupted during period C. In this case, as shown by the solid line in FIG. 5, the internal pressure value Pa of the right airbag 11a is lower than the threshold value Px during the threshold time Tx and during period C.

When the change in the internal pressure value Pb of the left airbag 11b is such that after the internal pressure value Pb exceeds the threshold value Py and further changes and increases, if the internal pressure value Pb becomes lower than the threshold value Py before the threshold time Tx ends, it is determined that the adjustment operation performed by the vehicle occupant is a short operation and the volume is decreased once by one step.

As a result, the vehicle occupant can adjust the volume of the audio device 10 without changing the line of sight while driving the vehicle that is traveling and without moving a finger. In this case, the vehicle occupant can complete an operation that requires a certain amount of time without any difficulty to adjust and increase or decrease the volume of the audio device 10 in steps. This improves convenience for the vehicle occupant when operating the audio device 10 while driving the vehicle.

(2) A vehicle seat may be provided with an airbag that is inflated and deflated by the supply and discharge of air so as to function to hold and maintain the vehicle occupant on the seat in a satisfactory seating posture. A vehicle seat may also be provided with an air-supply device that supplies air to an airbag and discharges the air from the airbag.

Figure 6:
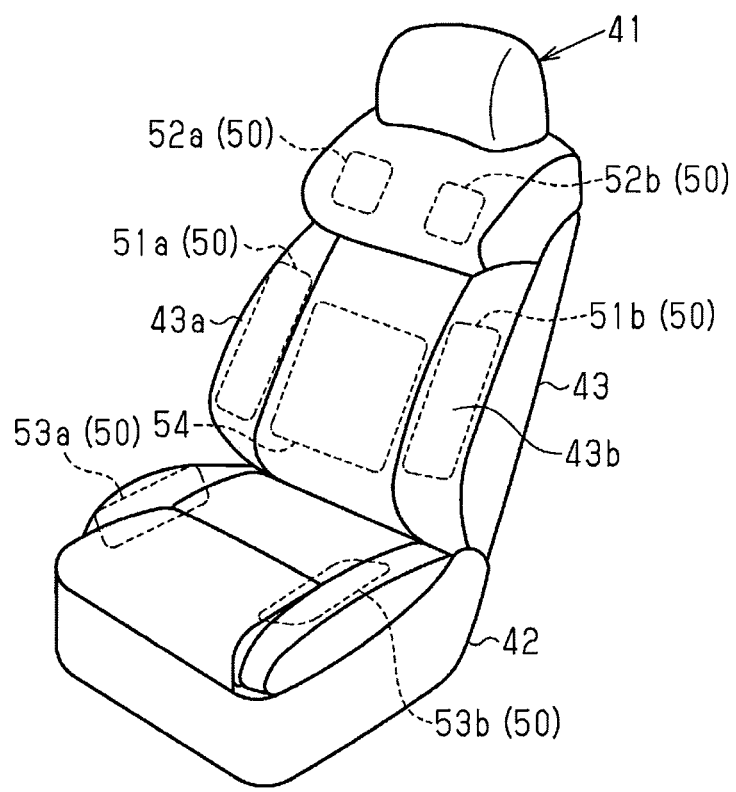
FIG. 6 is a schematic view of a seat having a different function.

For example, as shown in FIG. 6, a seat 41 includes a seat cushion 42 and a seatback 43 that can be tilted at the rear end of the seat cushion 42. Airbags 50 (51a, 51b, 52a, 52b, 53a, 53b, and 54) are coupled to the inside of the seat cushion 42 and the seatback 43 at predetermined positions. In particular, the two side-support airbags 51a and 51b are coupled to two side portions 43a and 43b, respectively. The seat 41 includes an air supply-discharge device that supplies and discharges air to and from each of the airbags 50.

Thus, the vehicle device operation apparatus 30 can be obtained by using the side-support airbags 51a and 51b as the airbags 11a and 11b of the present embodiment or combining the side-support airbags 51a and 51b with the airbags 11a and 11b. Even if the airbags 51a and 51b are not used as or not combined with the airbags 11a and 11b of the present embodiment, the air supply-discharge device of the seat 41 can be used to inflate or deflate the airbags 51a and 51b together with the airbags 11a and 11b. This is effective for reducing the cost and time used to obtain the vehicle device operation apparatus 30.

(3) In the present embodiment, the vehicle occupant produces a voice corresponding to an adjustment instruction to adjust the volume of the audio device 10.

When, for example, the airbags 51a and 51b are used as the airbags 11a and 11b, the voice of the vehicle occupant can be used to switch the function of the airbags 51a and 51b from a side-support function to a volume-adjustment function of the audio device 10. This allows the vehicle occupant to set the audio device 10 to a volume-adjustment mode just by producing a voice so that the volume of the audio device 10 can be adjusted without changing the line of sight while driving the vehicle that is traveling and without moving a finger. This improves the convenience.

(4) The controller 26 sets the mode for executing volume adjustment control on the audio device 10 in the process of step S10 when detecting an adjustment instruction. When the mode for executing volume adjustment control on the audio device 10 is set, in the process of step S11, the controller 26 instructs the air supply-discharge device 20 to supply air to each of the airbags 11a and 11b. Further, when the mode for executing volume adjustment control on the audio device 10 is stopped or ended, in the process of step S22, the controller 26 instructs the air supply-discharge device 20 to discharge air from each of the airbags 11a and 11b.

More specifically, with the present embodiment, even when, for example, the vehicle occupant cannot clearly recognize where each of the airbags 11a and 11b is located, each of the airbags 11a and 11b is supplied with air and inflated to come into close contact with the vehicle occupant. This allows the vehicle occupant to easily recognize where each of the airbags 11a and 11b is located. At the same time, when each of the airbags 11a and 11b comes into close contact with the body, the vehicle occupant can easily recognize that the volume of the audio device 10 is adjustable. When each of the airbags 11a and 11b is deflated and separated from the body, the vehicle occupant can easily recognize that the volume of the audio device 10 is no longer adjustable. This reduces error and misunderstanding when the vehicle device operation apparatus performs an adjustment operation. Thus, the vehicle occupant will not refrain from operating the vehicle device operation apparatus 30.

(5) For example, turning or hard braking of the vehicle may move the body even when the vehicle occupant does not intend to do so. In this case, if this, for example, presses the airbags 11a and 11b and changes the internal pressure, an adjustment operation that adjusts the actuation state of the audio device 10 will be detected regardless of the intention of the vehicle occupant. In the present embodiment, in the process of step S16, based on detection of turning or braking of the vehicle, the controller 26 invalidates adjustment operations so that detection of an adjustment operation is not reflected on the adjustment control as long as it is determined that an adjustment operation will not be intentionally performed by the vehicle occupant. This restricts adjustment of the volume of the audio device 10 when the vehicle occupant does not intend to do so and improves the reliability of the vehicle device operation apparatus 30.

The above embodiment may be modified as described below.

The process of step S16 may be omitted from the processing illustrated in FIG. 3. More specifically, when detecting an adjustment operation performed by the vehicle occupant, the adjustment operation may be directly reflected on the adjustment of the volume of the audio device 10.

In a turning or hard-braking travel state, the posture of the vehicle occupant becomes unstable and causes the internal pressure values Pa and Pb to increase or decrease. Thus, in step S16 of FIG. 3, instead of detecting the travel state of the vehicle, the controller 26 can detect how the internal pressure values Pa and Pb change to determine from the detection result whether the adjustment operation detected in step S15 was intentionally performed by the vehicle occupant. In this case, when, for example, varied amount of the increase or decrease in the internal pressure values Pa and Pb exceeds a threshold value, the controller 26 can determine that the adjustment operation detected in step S15 was not intentionally performed by the vehicle occupant.

Turning and hard braking of the vehicle may be detected based on information from another controller such as a brake controller that monitors and controls the vehicle brake state.

The supply of air to each of the airbags 11a and 11b may be started upon detection of an input of a vehicle ignition-on signal. More specifically, in a state in which the charging of each of the airbags 11a and 11b with air has been completed, the controller 26 can detect an adjustment instruction as illustrated in step S10 of FIG. 3. In this case, the discharge of air from each of the airbags 11a and 11b can be started upon detection of an input of a vehicle ignition-on signal. This allows the processes of steps S11 to S13 to be omitted from the processing of FIG. 3. The omitted processes can be executed at a different time or by another controller. This is effective for reducing the processing load on the controller 26 when executing volume adjustment control on the audio device 10.

When employing the above modification that supplies and discharges air to and from each of the airbags 11a and 11b in relation with an ignition signal, as shown in FIG. 6, the side-support airbags 11a and 11b attached to the seatback 43 and the airbags 52a and 52b that support the shoulders of the vehicle occupant may be used as the airbags 11a and 11b of the above embodiment. The same applies to the lower-body airbags 53a and 53b attached to the seat cushion 42 to support the lower body of the vehicle occupant and the lumbar support airbag 54 attached to the seatback 43. In this case, air can be supplied to and discharged from the airbags 50 by the same air supply-discharge device, and the vehicle device operation apparatus 30 does not need an air supply-discharge device dedicated for each airbag 50. This is effective for improving versatility.

In step S10 of FIG. 3, instead of detecting the voice of the vehicle occupant, the controller 26 can determine whether an adjustment instruction has been detected based on, for example, a predetermined body movement of the vehicle occupant such as leftward or rightward tilting of the body of the vehicle occupant. This allows the vehicle occupant to initiate volume adjustment of the audio device 10 by moving his or her body. In this case, in the same manner as when detecting the voice of the vehicle occupant in the above embodiment, the vehicle occupant only needs to move his or her body to initiate volume adjustment of the audio device 10. This is effective for improving the convenience.

In the above embodiment, the controller 26 adjusts the volume of the audio device 10 as the actuation state of a vehicle device. Adjustment of the actuation state of the vehicle device may include, for example, adjustment of an open amount of a side window in a vehicle door, adjustment of an open amount of a sun roof in a vehicle roof, adjustment of the slide position of the seat 1, adjustment of the speed of a wiper on a windshield of the vehicle, and adjustment of the angle of a side mirror. The controller 26 can adjust one or more of these vehicle device actuation states. When the controller 26 can adjust the actuation states of multiple vehicle devices, the controller 26 may determine from adjustment instructions corresponding to multiple adjustment subjects which one of the vehicle devices is to undergo the actuation-state adjustment. In this case, the vehicle occupant can produce a voice corresponding to an adjustment instruction to initiate selection of a vehicle device subject to adjustment. Consequently, when selecting the vehicle device that is subject to adjustment, the vehicle occupant only needs to produce a voice. Thus, as described above, the vehicle occupant can select the vehicle device that is subject to adjustment without changing the line of sight while driving the vehicle that is traveling and without moving a finger.

The location where the microphone 12 is set can be changed as long as the voice of the vehicle occupant is detectable. For example, the microphone 12 can be set on the steering wheel 9 or on the passenger compartment side of the vehicle roof.

In the above embodiment, instead of the airbags 11a and 11b, a deformable body such as a bag filled with a gas other than air may be used. Further, instead of the airbags 11a and 11b, a deformable body such as a bag filled with fluid other than water or the like may be used. In this case, instead of the air supply-discharge device 20, a device that supplies and discharges a liquid other than water or the like is used.

In the processing illustrated in FIG. 3, instead of the processes of steps S11 to S13, the controller 26 may detect how the internal pressure values Pa and Pb change to determine from the detection result whether each of the airbags 11a and 11b is in close contact with the vehicle occupant. In this case, when the varied amount of the increase or decrease in the internal pressure values Pa and Pb does not exceed a threshold value and becomes stable, the controller 26 can determine that the charging of each of the airbags 11a and 11b with air has been completed. In the same manner, in the processes of step S15 and step S19 illustrated in FIG. 3, the varied amount (change amount) of each of the internal pressure values Pa and Pb may be detected to determine, from the varied amount, an adjustment operation performed by the vehicle occupant.

The attaching position of each of the airbags 11a and 11b can be changed as long as the airbags 11a and 11b can be pressed when the vehicle occupant moves his or her body. For example, the attaching position of each of the airbags 11a and 11b may be shifted upward or downward from the positions in the above embodiment. Further, each of the airbags 11a and 11b may be attached to the two widthwise sides of the seat cushion 2 (positions corresponding to airbags 53a and 53b in FIG. 6). In this case, the vehicle occupant can press each of the airbags 11a and 11b by tilting the lower half of the body (thighs) leftward or rightward. Further, the airbags 11a and 11b can be attached to the upper part of the seatback 3 and the two sides (positions corresponding to airbags 52a and 52b of FIG. 6). In this case, the vehicle occupant can press each of the airbags 11a and 11b by tilting the shoulders leftward or rightward.

In the above embodiment, the number of the airbags 11a and 11b is two. However, there may be only one airbag. In this case, the airbag may be arranged on the left side or right side of the seat 1. In this case, the controller 26 can also detect an increase or decrease in the internal pressure value of the single airbag. For example, the controller 26 can increase the volume of the audio device 10 when the vehicle occupant presses the single airbag and increases the internal pressure value of the airbag, and the controller 26 can decrease the volume of the audio device 10 when the vehicle occupant moves away from the single airbag and decreases the internal pressure value of the airbag. Further, the single airbag can be attached to the substantially central part of the seatback 3 (position corresponding to airbag 54 in FIG. 6. In this case, the controller 26 detects an increase or decrease in the internal pressure value of the single airbag when the vehicle occupant moves and tilts his or her body frontward or backward. For example, the controller 26 can increase the volume of the audio device 10 when the vehicle occupant tilts his or her body backward to press the single airbag and increase the internal pressure value of the airbag, and the controller 26 can decrease the volume of the audio device 10 when the vehicle occupant tilts his or her body forward to move away from the single airbag and decrease the internal pressure value of the airbag.

Each of the airbags 11a and 11b may be attached to the surface of the seat 1 where the vehicle occupant is seated instead of the interior of the seatback 3 (seat 1). That is, the airbags 11a and 11b may be arranged at the outer side of the seatback 3 (seat 1).

As long as the inflated airbags 11a and 11b can be pressed by the vehicle occupant who tilts his or her body leftward or rightward, the airbags 11a and 11b do not have to closely contact or touch the vehicle occupant who is seated on the seat 1 in a neutral position posture.

Instead of the pressure sensors 25a and 25b, a single pressure sensor may be arranged in the flow passage L between the air pump 21 and the supply valves 23a and 23b. In this case, the internal pressure of each of the airbags 11a and 11b can be detected in a state in which one of the supply valves 23a and 23b is opened and the discharge valve 24 is closed. This reduces the number of the pressure sensors and effectively reduces the number of components.

The modifications can be combined. For example, each of the airbags 11a and 11b may be attached to the outside of the seatback 3 as a separate body in combination with another modification.

The invention claimed is:

1. A vehicle device operation apparatus, comprising:
a deformable body configured to be attached to a seat of a vehicle and filled with a fluid; and
a controller, wherein
the controller is configured to detect an internal pressure of the deformable body,
the controller is configured to detect an adjustment operation, which is an operation performed by a vehicle occupant to adjust an actuation state of a vehicle device, based on a change in the internal pressure of the deformable body that occurs when the vehicle occupant seated on the seat moves his or her body and presses the deformable body, and
the controller is configured to execute adjustment control, which adjusts the actuation state of the vehicle device, upon detection of the adjustment operation.

2. The vehicle device operation apparatus according to claim 1, wherein
the deformable body is an airbag configured to be inflated or deflated when the internal pressure is increased or decreased by supplying or discharging air,
the vehicle device operation apparatus comprising an air supply-discharge device including an air pump configured to send air to the airbag, a valve arranged in a flow passage connecting the airbag and the air pump, and a pressure sensor configured to detect the internal pressure of the airbag in the flow passage,
the controller is configured to detect the adjustment operation based on a detection result of the pressure sensor.

3. The vehicle device operation apparatus according to claim 1, comprising:
a voice detector configured to detect a voice produced by the vehicle occupant,
wherein the controller is configured to set a mode for executing the adjustment control based on a detection result of the voice detector.

4. The vehicle device operation apparatus according to claim 2, comprising:
a voice detector configured to detect a voice produced by the vehicle occupant, wherein
the controller is configured to instruct the air supply-discharge device to supply air to the airbag to set a mode for executing the adjustment control based on a detection result of the voice detector, and
the controller is configured to instruct the air supply-discharge device to discharge air from the airbag to end the mode for executing the adjustment control.

5. The vehicle device operation apparatus according to claim 1, comprising:
a vehicle state detection sensor configured to detect a travel state of the vehicle,
wherein the controller is configured to invalidate the adjustment operation detected while turning or hard braking of the vehicle is detected as the travel state based on a detection result of the vehicle state detection sensor.

* * * * *